United States Patent
Okada (10) Patent No.: US 10,447,941 B2
(45) Date of Patent: Oct. 15, 2019

(54) IMAGE CAPTURE APPARATUS AND METHOD OF CONTROLLING SAME

(71) Applicant: CANON KABUSHIKI KAISHA, Tokyo (JP)

(72) Inventor: Masao Okada, Kawasaki (JP)

(73) Assignee: Canon Kabushiki Kaisha, Tokyo (JP)

( * ) Notice: Subject to any disclaimer, the term of this patent is extended or adjusted under 35 U.S.C. 154(b) by 0 days.

(21) Appl. No.: 15/836,027

(22) Filed: Dec. 8, 2017

(65) Prior Publication Data
US 2018/0176442 A1 Jun. 21, 2018

(30) Foreign Application Priority Data

Dec. 16, 2016 (JP) .................................. 2016-244539

(51) Int. Cl.
*H04N 5/232* (2006.01)
*H04N 5/235* (2006.01)
*H04N 5/243* (2006.01)

(52) U.S. Cl.
CPC ......... *H04N 5/2353* (2013.01); *H04N 5/2352* (2013.01); *H04N 5/23232* (2013.01); *H04N 5/23245* (2013.01); *H04N 5/23251* (2013.01); *H04N 5/243* (2013.01)

(58) Field of Classification Search
None
See application file for complete search history.

(56) References Cited

U.S. PATENT DOCUMENTS

| | | | |
|---|---|---|---|
| 5,903,703 A | 5/1999 | Okada | |
| 6,181,656 B1 | 1/2001 | Kubo et al. | |
| 6,630,954 B1 | 10/2003 | Okada | |
| 6,928,229 B2 | 8/2005 | Okada | |
| 7,432,959 B2 | 10/2008 | Ueda | |
| 7,663,672 B2 | 2/2010 | Okada | |
| 9,420,195 B2 | 8/2016 | Komiya | |
| 9,674,437 B2 | 6/2017 | Tanaka | |
| 2004/0183921 A1 | 9/2004 | Ueda | |
| 2015/0086176 A1 | 3/2015 | Komiya | |
| 2015/0271407 A1 | 9/2015 | Tanaka | |
| 2016/0314591 A1* | 10/2016 | Komatsu | ............ H04N 5/23229 |

FOREIGN PATENT DOCUMENTS

| | | |
|---|---|---|
| JP | 2004-233664 A | 8/2004 |
| JP | 2015-061266 A | 3/2015 |
| JP | 2015-179971 A | 10/2015 |

* cited by examiner

*Primary Examiner* — Mark T Monk
(74) *Attorney, Agent, or Firm* — Venable LLP (57) ABSTRACT

In an interval capturing mode for performing automatic image capturing each set capturing interval, exposure settings including a shutter speed and capturing sensitivity are determined based on information relating to the capturing interval. Specifically, the exposure settings are determined by prioritizing a low shutter speed over a high capturing sensitivity when the capturing interval is a second capturing interval that is longer than the first capturing interval.

11 Claims, 4 Drawing Sheets

IMAGE CAPTURE APPARATUS AND METHOD OF CONTROLLING SAME

BACKGROUND OF THE INVENTION

Field of the Invention

The present invention relates to an image capture apparatus and a method of controlling the same.

Description of the Related Art

Image capture apparatuses and electronic devices having a function for intermittently performing automatic image capturing every predetermined amount of time (an interval capturing function) are increasing, and have become easy to use. Software for generating a movie that has an effect of shortening time by using a plurality of still images obtained by interval capturing can be easily acquired, and various such movies have been uploaded on the Internet. Such a movie generated by using still images obtained by interval capturing is referred to as a time-lapse movie, an interval movie, or the like (referred to below as a time-lapse movie).

Japanese Patent Laid-Open No. 2015-179971 (D1) recites, as a function for assisting interval capturing, avoiding a setting having a possibility of failing in interval capturing, by, in accordance with a setting value for one of a shutter speed and a capturing interval at a time of interval capturing, restricting the settable range for the other. D1 also recites restricting the settable range of a capturing interval or a shutter speed in accordance with a capturing mode or a captured scene.

D1 has a goal of mainly determining a setting range of a capturing interval and a shutter speed so that it is possible to reserve an amount of time required for processing of a captured image, and does not give particular consideration to other capturing parameters that are related to time such as capturing sensitivity, for example.

An amount of noise of a captured image differs in accordance with capturing sensitivity, but D1 does not recite anything in regard to how to determine a final shutter speed and capturing sensitivity in a range of shutter speeds that can be set for a capturing interval. Therefore, with the configuration recited in D1, it is not possible to suppress an increase in noise because a shutter speed and capturing sensitivity that are higher than necessary are set, and conversely, it is not possible to suppress the occurrence of motion blur because the shutter speed and capturing sensitivity are too low.

SUMMARY OF THE INVENTION

The present invention at the least alleviates such problems of the conventional technique. Specifically, the present invention provides an image capture apparatus for suppressing an increase in noise and motion blur in images that are automatically captured each predetermined capturing interval, and a method of controlling the same.

According to an aspect of the present invention, there is provided an image capture apparatus having an interval capturing mode for intermittently performing automatic image capturing every set capturing interval, the apparatus comprising: at least one processor or circuit executing a program stored in a memory to perform operations of the following unit: an exposure control unit configured to determine, in accordance with subject luminance, exposure settings including shutter speed and capturing sensitivity, wherein the exposure control unit: determines, based on information relating to the capturing interval, the exposure settings for each intermittent capturing in the interval capturing mode, and determines, based on the information relating to the capturing interval, the exposure settings in which a lower shutter speed is set in preference to a higher capturing sensitivity when the capturing interval is a second capturing interval that is longer than a first capturing interval.

According to another aspect of the present invention, there is provided an image capture apparatus having an interval capturing mode for intermittently performing automatic image capturing every set capturing interval, the apparatus comprising: at least one processor or circuit executing a program stored in a memory to perform operations of the following unit: an exposure control unit configured to determine, in accordance with subject luminance, exposure settings including a shutter speed and capturing sensitivity, wherein the exposure control unit determines the exposure settings for each time of capturing in the interval capturing mode by prioritizing a higher shutter speed over a lower capturing sensitivity as expected change or motion of a subject increases, based on information relating to the capturing interval.

According to a further aspect of the present invention, there is provided a method of controlling an image capture apparatus having an interval capturing mode for intermittently performing automatic image capturing every set capturing interval, comprising: determining, based on information relating to the capturing interval, exposure settings for each intermittent capturing in the interval capturing mode, wherein the exposure settings includes a shutter speed and capturing sensitivity, and wherein the exposure settings is determined so that a lower shutter speed is set in preference to a higher capturing sensitivity when the capturing interval is a second capturing interval that is longer than a first capturing interval based on the information relating to the capturing interval.

According to another aspect of the present invention, there is provided a method of controlling an image capture apparatus having an interval capturing mode for intermittently performing automatic image capturing every set capturing interval, comprising: determining exposure settings including a shutter speed and capturing sensitivity for each time of capturing in the interval capturing mode by prioritizing a high shutter speed over a low capturing sensitivity as expected change or motion of a subject increases, based on information relating to the capturing interval.

According to a further aspect of the present invention, there is provided a non-transitory computer-readable storage medium storing a program executable by a computer included in an image capture apparatus, wherein the image capture apparatus has an interval capturing mode for intermittently performing automatic image capturing every set capturing interval and comprises: an exposure control unit configured to determine, in accordance with subject luminance, exposure settings including shutter speed and capturing sensitivity, wherein the exposure control unit: determines, based on information relating to the capturing interval, the exposure settings for each intermittent capturing in the interval capturing mode, and determines, based on the information relating to the capturing interval, the exposure settings in which a lower shutter speed is set in preference to a higher capturing sensitivity when the capturing interval is a second capturing interval that is longer than a first capturing interval, wherein the program, when executed by the computer, causes the computer to function as the exposure control unit.

According to another aspect of the present invention, there is provided a non-transitory computer-readable storage medium storing a program executable by a computer included in an image capture apparatus, wherein the image capture apparatus has an interval capturing mode for intermittently performing automatic image capturing every set capturing interval and comprises: an exposure control unit configured to determine, in accordance with subject luminance, exposure settings including a shutter speed and capturing sensitivity, wherein the exposure control unit determines the exposure settings for each time of capturing in the interval capturing mode by prioritizing a higher shutter speed over a lower capturing sensitivity as expected change or motion of a subject increases, based on information relating to the capturing interval, wherein the program, when executed by the computer, causes the computer to function as the exposure control unit.

Further features of the present invention will become apparent from the following description of exemplary embodiments with reference to the attached drawings.

DESCRIPTION OF THE EMBODIMENTS

Exemplary embodiments of the present invention will now be described in detail in accordance with the accompanying drawings. Note that explanation is given here regarding a digital camera as an example of an image capture apparatus according to the present invention. However, application can be made to any electronic device having a function for performing automatic image capturing every predetermined amount of time (hereinafter referred to as an interval capturing function). Such an electronic device may be an image capture apparatus, a smart phone, a personal computer, a tablet computer, a media player, a PDA, a game device, or the like, but there is no limitation to these.

Figure 1:
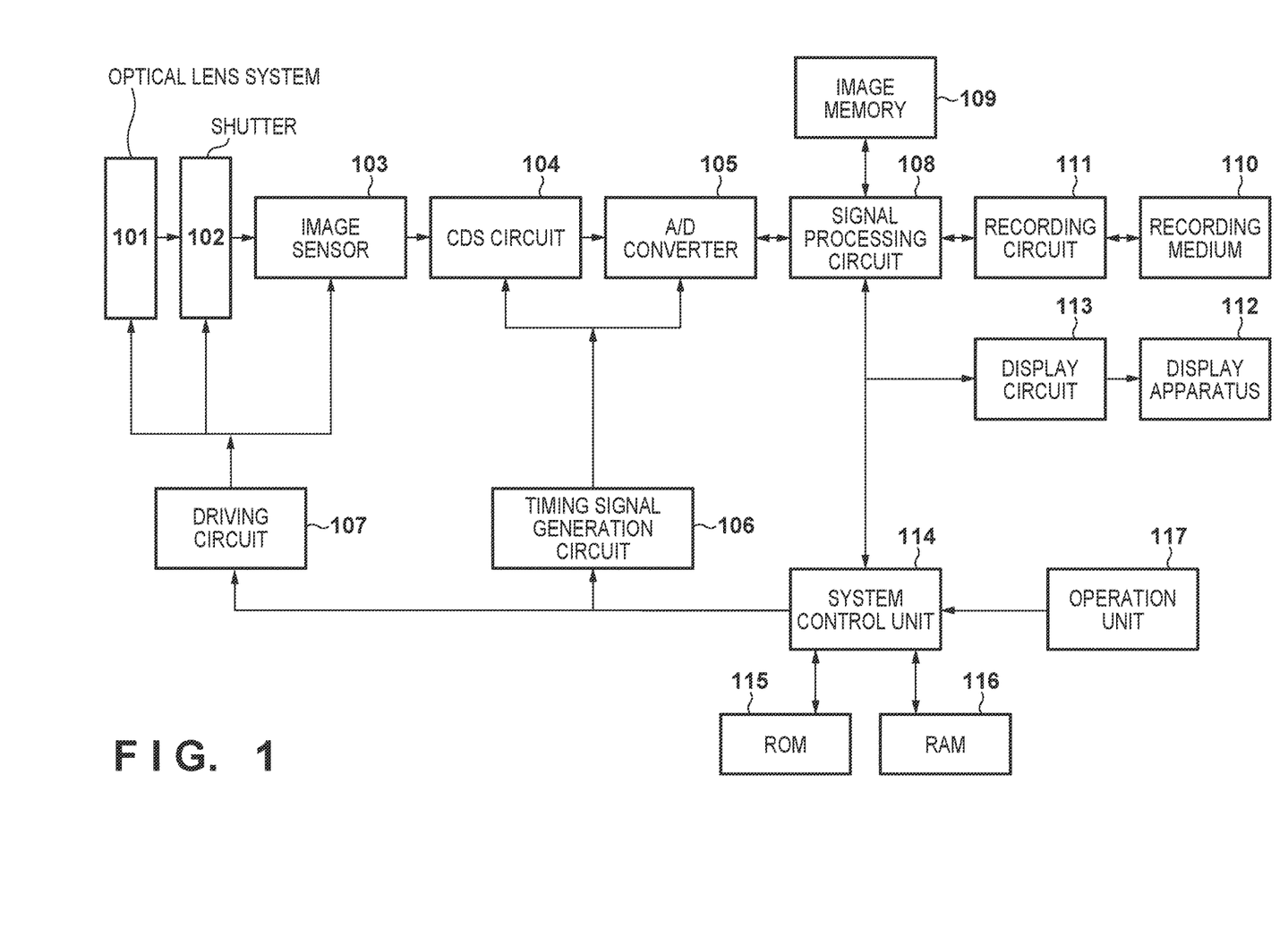
FIG. 1 is a view that illustrates an overview configuration of an image capture apparatus of the present invention.

FIG. 1 is a block diagram that illustrates an example of a functional configuration of a digital camera according to embodiments of the present invention. An optical lens system 101 includes a focus lens, and forms a subject image on an image capturing plane. The optical lens system 101 may include one or more of a zoom lens, an aperture (may have a shutter function), and a stabilization lens, and corresponding drive mechanisms. In addition, configuration may be taken such that the optical lens system 101 can be attached to and detached from a camera body.

A shutter 102 is a mechanical shutter, and opens and closes in accordance with a control signal. An image sensor 103 may be a CMOS or a CCD image sensor, for example, and performs resetting, accumulation, and output of charge in accordance with control signals. The image sensor 103 is provided with a plurality of pixels, and converts a subject image into an analog image signal in accordance with each pixel performing a photoelectric conversion of incident light.

A CDS (correlated double sampling) circuit 104 reduces clock-synchronous noise included in an analog image signal. A variable amplification circuit is provided on an output stage of the CDS circuit 104, and an amplification factor is controlled in accordance with a gain coefficient that is described later. An A/D converter 105 converts an analog image signal into a digital image signal (image data). A timing signal generation circuit 106 generates a signal for controlling operation timing of the CDS circuit 104 and the A/D converter 105. A driving circuit 107 generates driving signals for the moveable lens in the optical lens system 101 (a focus lens, a zoom lens, or a stabilization lens), the shutter 102, and the image sensor 103.

A signal processing circuit 108 is an image processing LSI (an ASIC, ASSP, or the like), for example, and applies various image processing or signal processing to image data. Processing that the signal processing circuit 108 applies may include white balance adjustment, demosaicing, gamma correction, tone correction, optical distortion correction, scaling, encoding/decoding, generation of an AF evaluation value, detection and recognition of a subject, extraction of a feature amount such as a luminance value, detection of a motion vector, or the like. However, this is a simply an example, and configuration may be taken such that some of these processes are not included and other processes are included. The signal processing circuit 108 also generates image data for display or an image data file in accordance with a recording format of image data.

An image memory 109 is used to temporarily store image data to which processing has been applied by the signal processing circuit 108, and a portion of the image memory 109 may be used as a display memory. A recording circuit 111 records an image data file stored in the image memory to a recording medium 110 which is a memory card, for example, and reads an image data file that is recorded in the recording medium 110.

A display circuit 113 generates a video signal for displaying by a display apparatus 112 from data of a display image that is stored in the image memory 109. The display apparatus 112 is a liquid crystal display or an organic EL display, for example, and performs a display in accordance with a video signal from the display circuit 113.

A system control unit 114 may be one or more programmable processor systems (a CPU, an MPU), for example. The system control unit 114 realizes functions of the digital camera by controlling operation of each unit described above in accordance with loading a program stored in a ROM 115 into a RAM 116, and executing the program, for example. The ROM 115 stores a program that the system control unit 114 executes, various setting values including a program chart or a program line which is described later, GUI data, or the like. The RAM 116 is used as a work memory of the system control unit 114.

Note that the system control unit 114 executes an AF operation based on an AF evaluation value generated by the signal processing circuit 108, and an AE operation based on a feature amount. An AF operation can be performed by at least one of a contrast detection method and a phase-difference detection method, in accordance with a type of the AF evaluation value. In addition, an AE operation can be executed based on luminance information (a representative luminance value, a luminance histogram, or the like) in an image, for example.

An operation unit 117 is a device group for a user to input an instruction to the digital camera. For example, the operation unit 117 includes a power supply switch, a release button, a movie recording start/stop button, a menu button, a directional key, a determination button, a capturing mode changing dial, a record/playback mode changing switch, or the like, but there is no limitation to these. When the display apparatus 112 is a touch display, a touch panel integrated in the display apparatus 112 is also included in the operation unit 117. Note that the operation unit 117 may include a configuration for accepting speech input, line-of-sight input, or the like.

In the digital camera according to the present embodiment, an interval capturing mode (or a time-lapse movie capturing mode) is entered in accordance with a selection through the capturing mode changing dial included in the operation unit 117, or in accordance with a setting made through a GUI screen. Note that a time-lapse movie is a movie that reproduces in chronological order a plurality of images captured in the interval capturing mode, and an operation for capturing a time-lapse movie is the same as an interval capturing operation. Consequently, in the following explanation, recitations regarding capturing of a time-lapse movie can also be applied unchanged to interval capturing. Note that images captured each time in interval capturing may be a predetermined number of still images (images for recording) or may be a movie of a predetermined amount of time. In addition, configuration may be such that the images captured each time in interval capturing are extracted from frames of a movie, in accordance with the capturing interval.

(Overview of Operation of Digital Camera)

Next, explanation is given regarding a still image capturing operation in the digital camera of FIG. 1.

The release button included in the operation unit 117 has a switch SW1 which turns on when the release button is approximately half-pushed, and a switch SW2 which turns on when the release button is fully pushed. Upon detecting the switch SW1 turning on, the system control unit 114 executes a capturing preparation operation—specifically an AF operation and an AE operation. An AF operation can be executed in accordance with the phase-difference detection method or the contrast detection method, based on a captured image (a live view image), for example. For example, the signal processing circuit 108 calculates an AF evaluation value or a defocus amount from image data, and outputs it to the system control unit 114. The system control unit 114 controls the driving circuit 107 so that the focus lens of the optical lens system 101 moves to a position where the AF evaluation value is maximum or a position defined in accordance with the defocus amount.

In addition, an AE operation can be performed by, for example, the signal processing circuit 108 calculating luminance information of a captured image, and the system control unit 114 determining a shutter speed, an aperture value, and capturing sensitivity based on the luminance information and an program chart stored in the ROM 115. Note that the AF operation and the AE operation explained here are examples, and it is possible to use any publicly known method therefor. Note that if a manual focus is set, the system control unit 114 does not perform an AF operation.

Upon detecting the switch SW2 turning on, the system control unit 114 executes an image capturing operation for recording an image. The system control unit 114 sets the gain of an amplifier included in the CDS circuit 104, for example, to a value in accordance with capturing sensitivity. The system control unit 114 controls the driving circuit 107 to set an opening amount of the aperture included in the optical lens system 101 to an opening amount that corresponds to the aperture value determined by the AE processing, for example. In addition, the system control unit 114 controls the driving circuit 107 to drive the shutter 102 at a shutter speed (an exposure duration) determined by the AE processing and expose the image sensor 103. When the image sensor 103 has an electronic shutter function, it may be used together with the shutter 102.

The image sensor 103 is driven by a driving pulse based on an operation pulse generated by the timing signal generation circuit 106 which is controlled by the system control unit 114, converts a subject image to an analog image signal, and outputs the analog image signal. The analog image signal outputted from the image sensor 103 is converted to image data through the A/D converter 105 and the CDS circuit 104 which operates in accordance with the operation pulse generated by the timing signal generation circuit 106, which is controlled by the system control unit 114. Next, various processing is applied to the image data in the signal processing circuit 108, and then the image data is stored in the image memory 109.

The image data stored in the image memory 109 is recorded in the recording medium 110 through the recording circuit 111, or displayed on the display apparatus 112 through the display circuit 113 after being scaled by the signal processing circuit 108.

Note that, when continuous shooting is being performed, still image capturing processing is repeatedly executed. For second and subsequent images of continuous shooting, AF processing or AE processing may be performed every time, or capturing may be performed with the same conditions as the first capture. Discussion of processing for still image capturing thus concludes.

When a press of the movie recording button included in the operation unit 117 is detected, the system control unit 114 starts a movie recording operation. A movie recording operation is similar to processing that continuously executes still image capturing. The system control unit 114 continuously executes AF and AE operations in parallel with the movie recording operation. The system control unit 114 continues the movie recording operation until it detects a press of the movie recording button again. Note that configuration may be taken such that still image capturing is performed when the switch SW1 or SW2 is turned on during a movie recording operation.

Next, explanation is given regarding a playback operation for image data recorded in the recording medium 110. In accordance with control from the system control unit 114, the recording circuit 111 reads out image data from the recording medium 110. The signal processing circuit 108 stores the image data read out by the recording circuit 111 into the image memory 109.

Note that the signal processing circuit 108 applies decoding processing when the image data is encoded. The image data stored in the image memory 109 is scaled by the signal processing circuit 108, and then displayed on the display apparatus 112 through the display circuit 113.

(Exposure Control when Capturing a Time-Lapse Movie)

Figure 2:
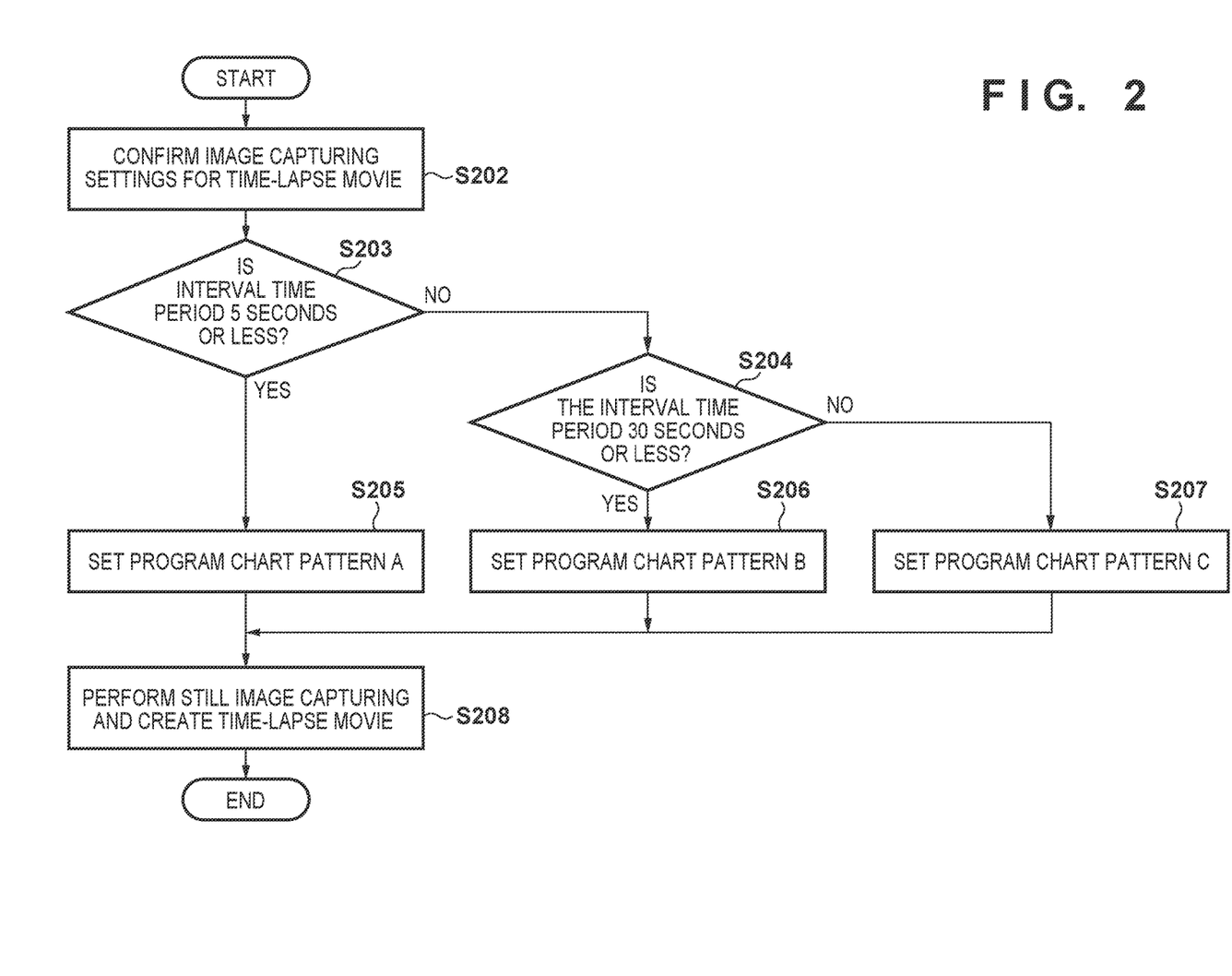
FIG. 2 is a flowchart representing processing operations of an embodiment of the present invention.

Next, with reference to the flowchart illustrated on FIG. 2, explanation is given regarding an exposure control operation when capturing a time-lapse movie. The operation of FIG. 2 is executed when an instruction to execute time-lapse movie capturing is detected, for example. The instruction to execute time-lapse movie capturing may be made by a release button being fully pressed in a state where the time-lapse movie capturing mode is set, or may be made by any detectable operation, for example.

In step S202, the system control unit 114 confirms an interval time period (a capturing interval) out of settings for time-lapse movie capturing that are stored in the ROM 115, for example. Settings for time-lapse movie capturing include a number of images to be captured, a frame rate of a movie to generate, or the like.

In step S203, the system control unit 114 decides whether the interval time period that is set is less than or equal to a first time period (5 seconds here), and advances the processing to step S205 upon deciding that the interval time period is less than or equal to the first time period or to step S204 when this is not decided.

In step S204, the system control unit 114 decides whether the interval time period that is set is less than or equal to a second time period longer than the first time period (30 seconds here), and advances the processing to step S206 upon deciding that the interval time period is less than or equal to the second time period or to step S207 when this is not decided.

In step S205 through step S207, the system control unit 114 selects, in accordance with expected magnitude of change or motion, one program chart to use out of a plurality of program charts prepared in advance.

Figure 4A:
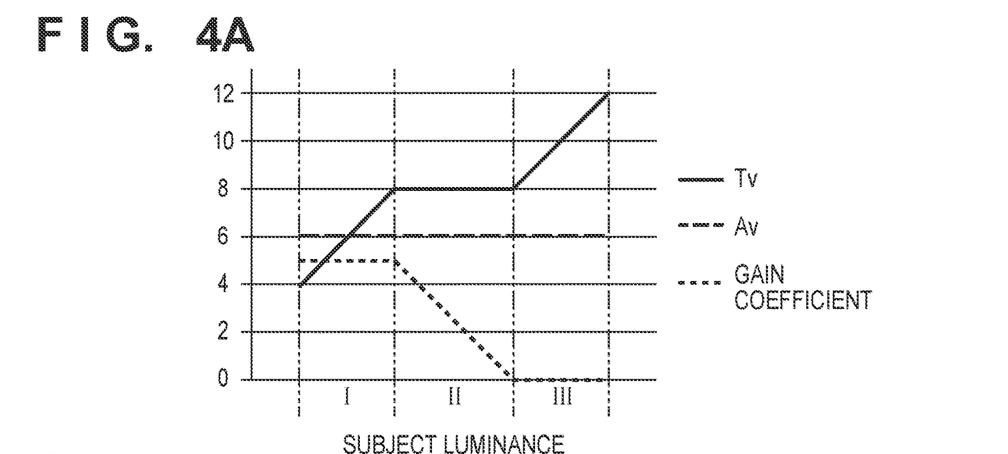
FIG. 4A through FIG. 4C are views illustrating program charts at times of time-lapse movie capturing.

In step S205, the system control unit 114 sets so as to use program chart pattern A illustrated in FIG. 4A in time-lapse movie capturing.

Figure 4B:
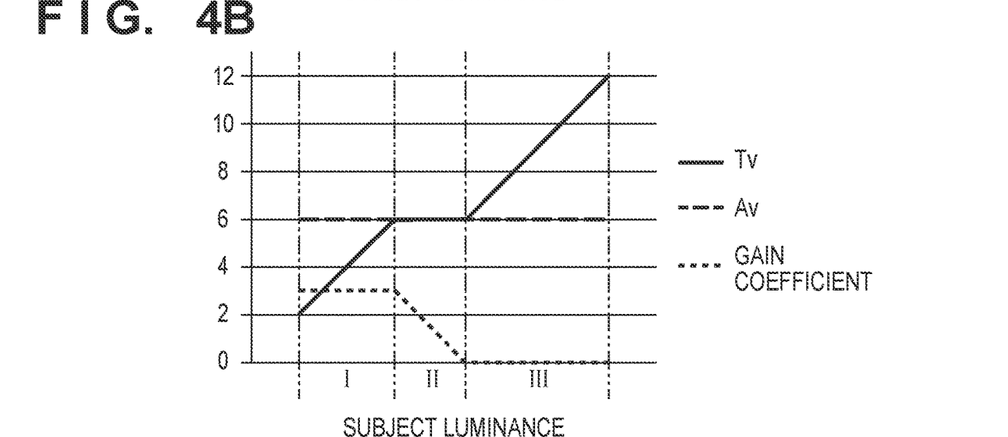

In step S206, the system control unit 114 sets so as to use program chart pattern B illustrated in FIG. 4B in time-lapse movie capturing.

Figure 4C:
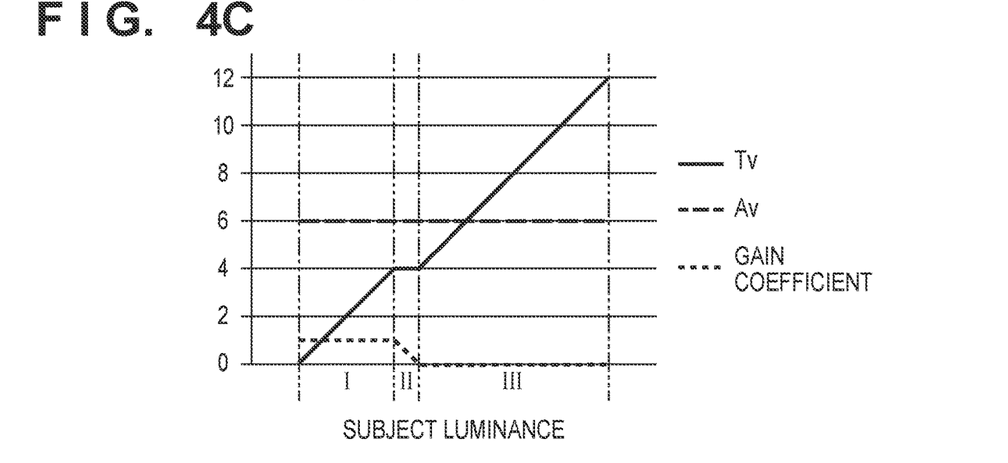

In step S207, the system control unit 114 sets so as to use program chart pattern C illustrated in FIG. 4C in time-lapse movie capturing.

The first time period and the second time period used in step S203 and in step S204 are information relating to the magnitude of change or motion of a scene or subject that is a target of time-lapse movie capturing by a user. If the number of images captured is too small with respect to change or motion of a scene or subject, the motion or change of the scene or subject will cease to be smooth in the time-lapse movie. If the number of images captured is too large with respect to change or motion of a scene or subject, the motion or change of the scene or subject will be too slow in the time-lapse movie. Therefore, generating a smooth time-lapse movie requires setting an appropriate capturing interval with respect to magnitude of motion of the subject.

From such a relationship between the capturing interval and the magnitude of change or motion of a scene or subject, it is expected that a subject or scene having comparatively high change or motion is to be captured if a short capturing interval is set. In addition, it is expected that a scene or subject having comparatively low change or motion is to be captured if a long capturing interval is set. Therefore, as an example in the present embodiment, an interval time period is divided into three sections in accordance with two time period thresholds—the first time period and the second time period, and exposure control is executed by using an program chart suitable for a scene or subject envisioned in each section.

Figure 3:
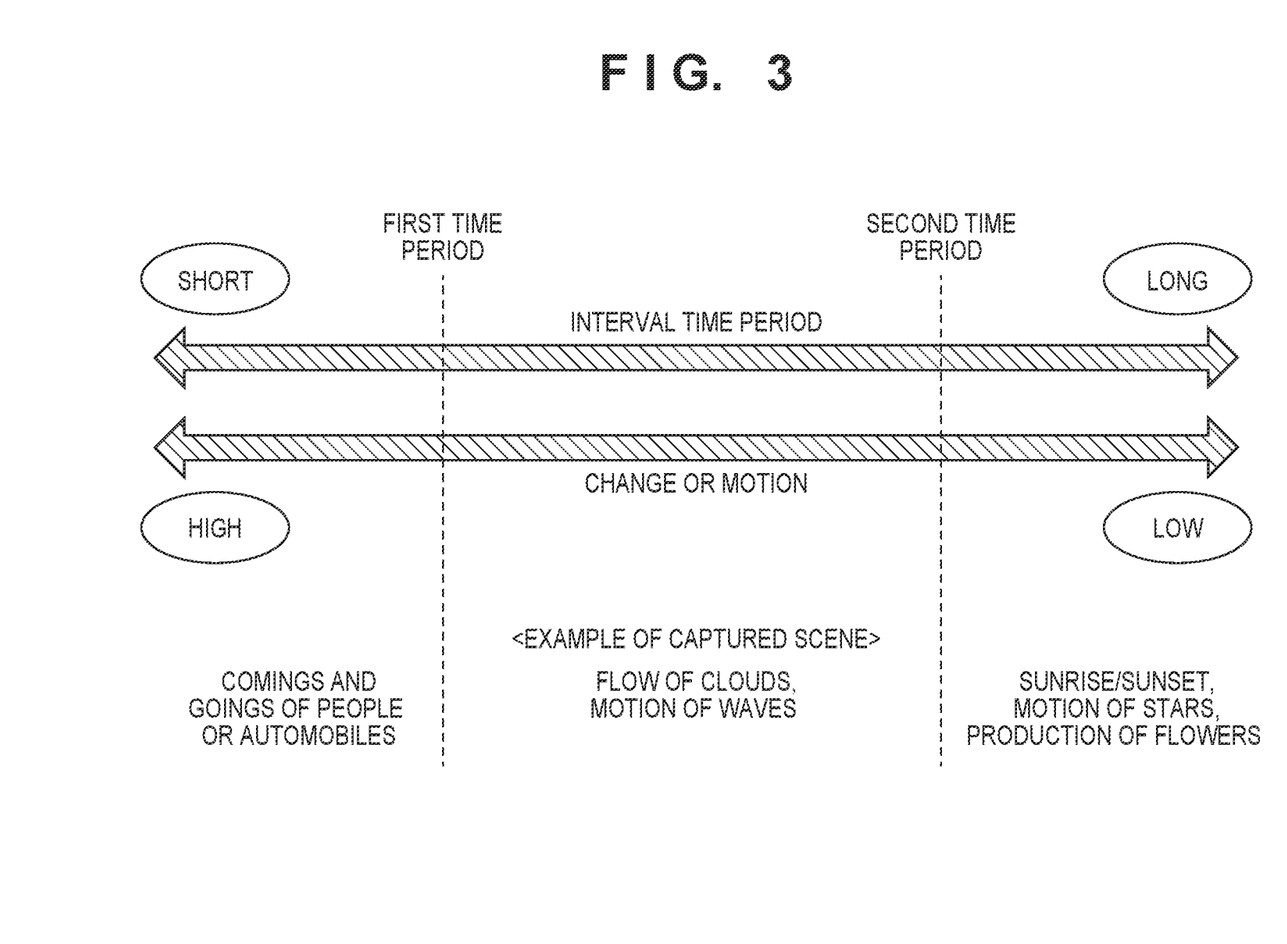
FIG. 3 is a view illustrating an example of captured scenes and interval time period settings at times of time-lapse movie capturing.

FIG. 3 is a view that schematically illustrates an example of a relation between an interval time period and examples of subjects of time-lapse movies.

For example, in the case of capturing a scene or subject having high (fast) motion over time, such as comings and goings of people or automobiles, the interval time period is often set to a comparatively short value such as 1 second to 5 seconds. Meanwhile, in the case of capturing a scene or the subject having low (slow) motion over time such as the motion of the sun or stars, plant growth, or the production of flowers, for example, the interval time period is often set to a comparatively long value such as 30 seconds to several minutes. In addition, in the case of capturing a scene or subject having approximately medium motion over time such as the movement of clouds or the motion of waves, for example, the interval time period is often set to about 5 seconds to 30 seconds.

Therefore, 5 seconds and 30 seconds are used as the first time period and the second time period in the present embodiment. However, these values are simply examples, and other values may be used. In addition, a number of divisions of the interval time period (the type of program chart to use) may be four or more, and may be three or less.

In step S208, each time the set interval time period elapses, the system control unit 114 determines exposure settings in accordance with subject luminance at the time of capturing and the program chart set in any of step S205, step S206, and step S207, and then automatically executes still image capturing. The system control unit 114 ends interval capturing upon reaching the set number of images to capture. When the interval capturing ends, the system control unit 114 uses a signal processing circuit 106 to generate a movie from the plurality of still images obtained by the interval capturing. There is no particular restriction on a method of generating the movie. For example, it is possible to generate a movie that takes the plurality of still images obtained by the interval capturing as a frame image in chronological order. In the case of a movie having a frame rate of 30 frames/second, a one second movie is generated from 30 still images.

Here, FIG. 4A through FIG. 4C are used to give an explanation regarding a concrete example of the program charts set in step S205, step S206, and step S207. FIGS. 4A through 4C respectively correspond to program chart pattern A through pattern C.

In an program chart, a solid line represents Av (Aperture Value), a dashed line represents Tv (Time Value), and a dotted line represents a gain coefficient (capturing sensitivity). In addition, the abscissa is subject luminance, with the luminance increasing in a rightward direction. The ordinate represents the Av value, the Tv value, and the gain coefficient, and a larger value is taken in an upward direction. Generally, the Av value and the Tv value get smaller and the gain coefficient gets larger the lower the luminance is—in other words, the aperture is opened, the shutter speed is set to a low speed, and the gain coefficient is increased so as to obtain a necessary exposure amount. Conversely, as the luminance increases, generally the Av value and the Tv value increase and the gain coefficient decreases—in other words the aperture is closed, the shutter speed is increased, and the gain coefficient is reduced.

In capturing of a time-lapse movie, to suppress fluctuation of brightness due to mechanical variation of an aperture mechanism, the aperture value is often set to a constant, and in the present embodiment it is assumed that capturing is performed with the Av value fixed to 6.

In addition, it is assumed that minimum and maximum shutter speeds correspond to Tv 0 and Tv 12, and that a maximum gain coefficient is Gain 5. The gain coefficient represents an increase ratio of a standard gain of a variable amplifier provided in the CDS circuit 104, and the minimum gain coefficient of Gain 0 represents an increase ratio of 0% (in other words, no increase of gain). By using the gain coefficient, it is possible to cause capturing sensitivity to increase more than a predetermined value (a standard sensitivity), and the maximum gain coefficient Gain 5 corresponds to a maximum capturing sensitivity.

FIG. 4A illustrates an example of program chart pattern A set in step S205 in which a subject having large motion or change is envisioned. For example, in the first or a low-luminance region I, which represents a range of luminance values that are less than a predetermined threshold, the gain coefficient is fixed at Gain 5 and the aperture is fixed at Av 6. In addition, the shutter speed is caused to linearly increase (get faster) from Tv 4 to Tv 8 together with an increase in subject luminance.

In the second region II, which represents a range of luminance values being are larger than the predetermined threshold and less than the lowest luminance value of the region III, the shutter speed is fixed at Tv 8 and the aperture is fixed at Av 6. The gain coefficient is caused to linearly decrease from Gain 5 to Gain 0 together with an increase of subject luminance.

In the third or a high-luminance region III, which represents a range of the highest luminance values, the gain coefficient is fixed to Gain 0, and the aperture is fixed to Av 6. The shutter speed is caused to increase from Tv 8 to Tv 12 (maximum speed) together with an increase of subject luminance.

Because a subject having high motion or change is envisioned for pattern A, noise is hard to notice at a time of playback of a time-lapse movie, even if it increases somewhat. Therefore, automatic exposure control in accordance with the program chart of pattern A is aimed to raise values for the maximum capturing sensitivity and the minimum shutter speed. Specifically, in the low-luminance region I, exposure settings are determined in which the gain coefficient is maximized, as high a shutter speed as possible is used, and emphasis is given on suppressing motion blur rather than an increase in noise. When a subject luminance for which the shutter speed is somewhat higher is reached, subsequently the gain coefficient is caused to decrease to the minimum value in the second region II, together with the increase of subject luminance. When the gain coefficient reaches the minimum value, subsequently the shutter speed is caused to increase in the region III together with an increase of subject luminance.

FIG. 4B illustrates an example of program chart pattern B set in step S206 in which a subject having approximately intermediate motion or change is envisioned. In the low-luminance region I, the gain coefficient is fixed to Gain 3, and the aperture is fixed to Av 6. In addition, the shutter speed is caused to linearly increase (get faster) from Tv 2 to Tv 6 together with an increase of subject luminance. Because a subject having change or motion lower than that in pattern A is envisioned, for low-luminance values the shutter speed is slower and the gain coefficient is smaller than in pattern A. Because the maximum value of the gain coefficient in pattern B is smaller than in pattern A, the second region II in which the gain coefficient decreases to the minimum value is narrower than in pattern A. When the gain coefficient reaches the minimum value, subsequently the shutter speed is caused to increase in the third region III together with an increase of subject luminance.

The program chart for pattern B is a chart that is between the patterns A and C. It is possible to, with good balance, suppress motion blur and an increase in noise due to an increase in the gain coefficient.

FIG. 4C illustrates an example of program chart pattern C set in step S207 in which a subject having low motion or change is envisioned. In the low-luminance region I, the gain coefficient is fixed to Gain 1, and the aperture is fixed to Av 6. In addition, the shutter speed is caused to linearly increase (get faster) from Tv 0 to Tv 4 together with an increase of subject luminance. Because a subject having change or motion even lower than that in pattern B is envisioned, for low-luminance values the shutter speed is slower and the gain coefficient is smaller than in pattern B. Because the maximum value of the gain coefficient in pattern C is smaller than in pattern B, the second region II in which the gain coefficient decreases to the minimum value is narrower than in pattern B. When the gain coefficient reaches the minimum value, subsequently the shutter speed is caused to increase in the third region III together with an increase of subject luminance.

Because a subject having low change or motion is envisioned with the pattern C, it is easy for noise to be noticed when reproducing a time-lapse movie. Therefore, automatic exposure control in accordance with the program chart of pattern C has low values for the maximum capturing sensitivity and the minimum shutter speed. Specifically, emphasis is given on suppressing noise rather than suppressing motion blur, by using a slow shutter speed and keeping the gain coefficient low in the low-luminance region I.

It is considered that the program charts explained here cause the priority of high shutter speed and of low capturing sensitivity to differ in accordance with the magnitude of change or motion of a subject estimated from an interval time period, in the determination of exposure settings for a low-luminance region in particular.

By virtue of the present embodiment as explained above, automatic exposure control in which a maximum capturing sensitivity and a minimum shutter speed are caused to differ in accordance with a set interval time period (a capturing interval) is performed. Specifically, in the case where the interval time period is less than or equal to a first threshold, automatic exposure control having a maximum capturing sensitivity and a minimum shutter speed that are higher than in the case where the interval time period is larger than the first threshold is performed. Therefore, it is possible to realize exposure control suitable for the magnitude of change or motion of a subject of interval capturing, and it is possible to effectively suppress noise and motion blur in a time-lapse movie.

Other Embodiments

In the embodiment described above, configuration may be taken so that the maximum capturing sensitivity is caused to increase as necessary such that, in the program chart pattern C which has the lowest minimum shutter speed, the minimum shutter speed is in a range in which capturing in the set interval time period is possible.

In addition, configuration may be taken such that the aperture is not necessarily fixed. For example, configuration may be taken to perform automatic exposure control so that a change is made for the aperture value so as to broaden a supportable subject luminance range or increase the maximum shutter speed.

Note that the present invention is not limited to the configuration of the exemplary embodiment described above, and various changes can be made within the scope specified by the scope of the claims.

Embodiment(s) of the present invention can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present invention has been described with reference to exemplary embodiments, it is to be understood that the invention is not limited to the disclosed exemplary embodiments. The scope of the following claims is to be accorded the broadest interpretation so as to encompass all such modifications and equivalent structures and functions.

This application claims the benefit of Japanese Patent Application No. 2016-244539, filed on Dec. 16, 2016, which is hereby incorporated by reference herein in its entirety.

What is claimed is:

1. An image capture apparatus having an interval capturing mode for intermittently performing automatic image capturing every set capturing interval, the apparatus comprising:
    at least one processor or circuit executing a program stored in a memory to perform operations of: an exposure control unit configured to determine, in accordance with subject luminance, exposure settings including shutter speed and capturing sensitivity,
    wherein the exposure control unit (a) determines, based on information relating to the capturing interval, the exposure settings for each intermittent capturing in the interval capturing mode, and (b) determines, for a same subject luminance within a range of subject luminance being less than or equal to a predetermined threshold, the exposure settings such that a lower shutter speed and a lower capturing sensitivity are set, in a case where the capturing interval is a second capturing interval than in a case where the capturing interval is a first capturing interval, and
    wherein the second capturing interval is longer than the first capturing interval.

2. The image capture apparatus according to claim 1, wherein the exposure control unit, for a same subject luminance within the range of subject luminance being less than or equal to the predetermined threshold, determines the exposure settings such that a higher shutter speed and a higher capturing sensitivity are set in a case where the capturing interval is the first capturing interval than in a case where the capturing interval is the second capturing interval.

3. The image capture apparatus according to claim 1, wherein the exposure control unit, for the range of subject luminance being less than or equal to the predetermined threshold, determines the exposure settings such that a settable high capturing sensitivity and a settable high shutter speed are higher in a case where the capturing interval is the first capturing interval than in a case where the capturing interval is the second capturing interval.

4. The image capture apparatus according to claim 2, wherein the exposure control unit, for the range of subject luminance being greater than the predetermined threshold, determines the exposure settings so that the shutter speed increases after first causing capturing sensitivity to decrease to a predetermined value in conjunction with an increase of subject luminance, irrespective of the information relating to the capturing interval.

5. The image capture apparatus according to claim 1, wherein the exposure control unit determines the exposure settings such that a lower shutter speed and a lower capturing sensitivity are set in a case where the capturing interval is a third capturing interval than in a case where the capturing interval is the first capturing interval and than in a case where the capturing interval is larger than the second capturing interval, and
    wherein the third capturing interval is longer than the first capturing interval and is longer than the second capturing interval.

6. The image capture apparatus according to claim 1, wherein the exposure control unit determines the exposure settings by using one of a plurality of program charts prepared in advance that is selected in accordance with the information relating to the capturing interval.

7. The image capture apparatus according to claim 1, the at least one processor or circuit further performs operations of a generation unit configured to generate a movie that reproduces images captured in the interval capturing mode in chronological order.

8. The image capture apparatus according to claim 1, wherein the information relating to the capturing interval is a capturing interval for the interval capturing mode that is set by a user.

9. The image capture apparatus according to claim 1, wherein the information relating to the capturing interval is information relating to a capturing mode or a captured scene for which a capturing interval for the interval capturing mode is set in advance.

10. A method of controlling an image capture apparatus having an interval capturing mode for intermittently performing automatic image capturing every set capturing interval, the method comprising:
    determining, based on information relating to the capturing interval, exposure settings for each intermittent capturing in the interval capturing mode, wherein the exposure settings include a shutter speed and a capturing sensitivity,
    wherein, for a same subject luminance within a range of subject luminance being less than or equal to a predetermined threshold, the exposure settings are determined such that a lower shutter speed and a lower capturing sensitivity are set in a case where the capturing interval is a second capturing interval than in a case where the capturing interval is a first capturing interval, and
    wherein the second capturing interval is longer than the first capturing interval.

11. A non-transitory computer-readable storage medium storing a program executable by a computer included in an image capture apparatus, wherein the image capture apparatus has an interval capturing mode for intermittently performing automatic image capturing every set capturing interval, wherein, the program causes, when executed by the computer, the computer to function as an exposure control unit configured to determine, in accordance with subject luminance, exposure settings including shutter speed and capturing sensitivity, wherein the exposure control unit (a) determines, based on information relating to the capturing interval, the exposure settings for each intermittent capturing in the interval capturing mode, and (b) determines, for a same subject luminance within a range of subject luminance being less than or equal to a predetermined threshold, the exposure settings such that a lower shutter speed and a lower capturing sensitivity are set in a case where the capturing interval is a second capturing interval than in a case where the capturing interval is a first capturing interval, wherein the second capturing interval is larger than the first capturing interval.

* * * * *